Sheet 2—2 Sheets.

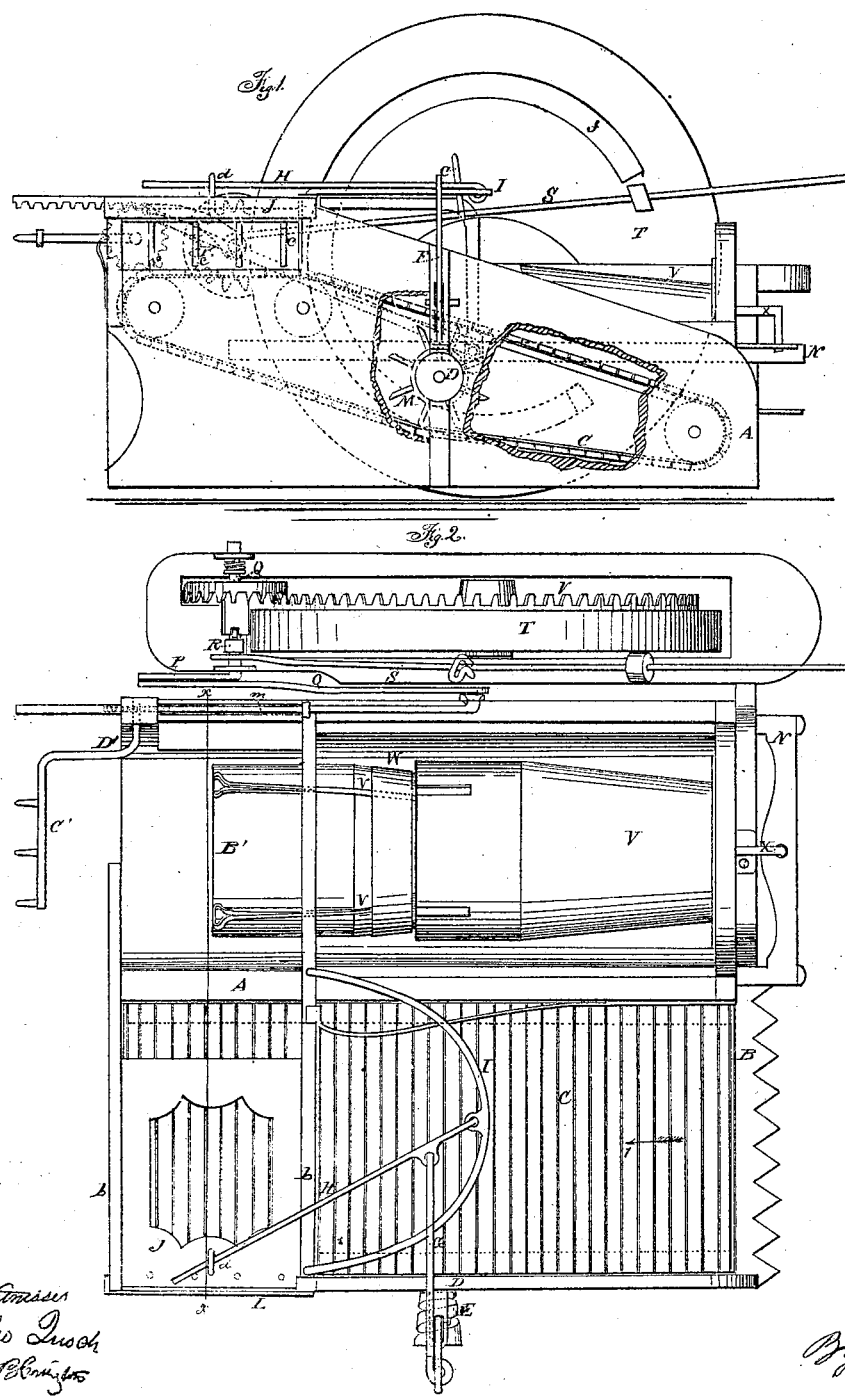

T. W. Pierce.
Grain Binder.

Nº 52,195.   Patented Jan. 23, 1866.

UNITED STATES PATENT OFFICE.

T. W. PEIRCE, OF MINNEAPOLIS, MINNESOTA.

IMPROVEMENT IN BINDING ATTACHMENT TO REAPING-MACHINES.

Specification forming part of Letters Patent No. 52,195, dated January 23, 1866.

*To all whom it may concern:*

Be it known that I, T. W. PEIRCE, of Minneapolis, in the county of Hennepin and State of Minnesota, have invented a new and Improved Grain Raking and Binding Attachment for Reapers; and I do hereby declare that the following is a full, clear, and exact description thereof, which will enable those skilled in the art to make and use the same, reference being had to the accompanying drawings, forming part of this specification, in which—

Figure 3:
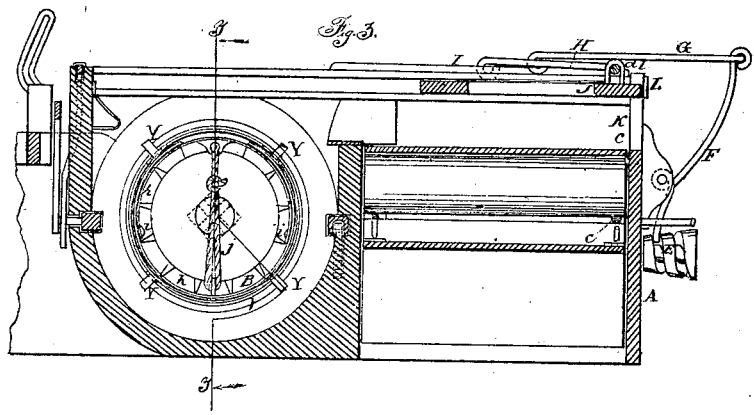
Figure 4:
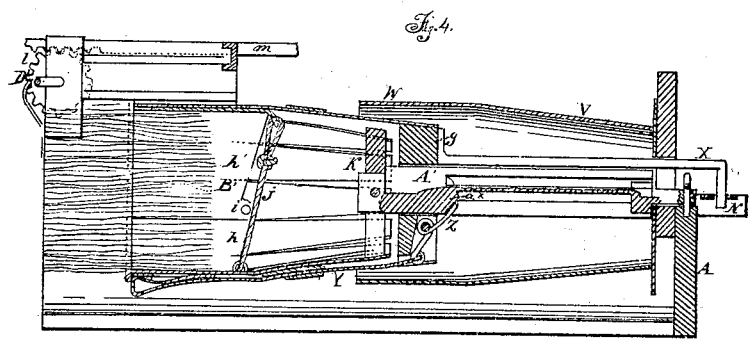
Figure 5:
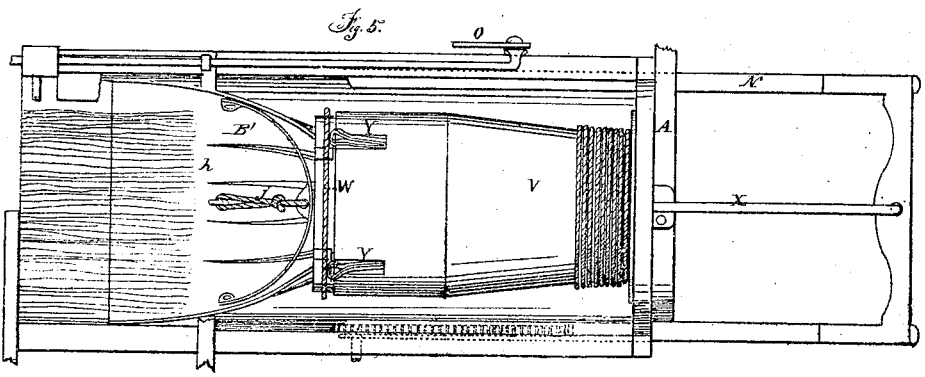

Figure 1, Sheet No. 1, is a side view of a reaper with my invention applied to it; Fig. 2, a plan or top view of the same; Fig. 3, Sheet No. 2, a vertical section of the same taken in the line $x\,x$, Fig. 3; Fig. 4, a vertical section of the same taken in the line $y\,y$, Fig. 3; Fig. 5, a detached plan or top view of a portion of the same.

Similar letters of reference indicate corresponding parts.

This invention relates to a new and improved raking and binding attachment for reapers, whereby the grain as it is cut is raked up into gavels of proper size, and bound into sheaves. The invention is designed to economize in labor by performing simultaneously, and with one and the same machine, the operations of reaping grain, raking the same into gavels, and binding the latter into sheaves.

A represents the framing of a reaper, which may be constructed in any proper manner, and B is the sickle which may be constructed and operated in the ordinary or any suitable way. The invention may be applied to any reaper. The one represented in the drawings is known as the "Esterly reaper."

C represents an endless apron, which works over pulleys at the rear of the sickle B, and extends backward therefrom about at right angles in a slightly inclined position, as shown by the dotted lines in Fig. 1. Through this apron C there passes transversely a shaft, D, having upon its outer end, which projects through the side of the reaper, a screw, E, into which the lower end of a lever, F, is fitted, the upper end of said lever being connected by a rod, G, with an arm, H, one end of which works in a curved bar, I, on the framing of the reaper above the apron C, the opposite end passing through an eye or loop, $a$, in a slide, J, which is fitted between ways or guides $b\,b$ on the rear of the framing of the machine, at right angles with the apron C, and over the rear part of the same. This slide J has pendent teeth $c$ attached to it to form a rake, K, and to the rear ends of the guides $b\,b$ a bar, L, is attached to serve as a stop.

On the shaft D there is placed a pinion, M, constructed in such a manner that it will engage with the apron C, and move it in one direction only, as indicated by the arrow 1. The shaft D is turned first in one direction and then in the other by means of a reciprocating frame, N, one side of which is provided with a rack-bar, $c$, which works in a pinion, $d$, on shaft D.

The frame N has a reciprocating motion given it by means of a pitman, O, attached to a crank, P, at one end of a shaft, $e$, on which a pinion, Q, is placed loosely, and is connected with the shaft $e$, when desired, by means of a clutch, R, operated by a lever, S, the latter being actuated by a cam, $f$, at the inner side of the driving-wheel T of the machine. (See Figs. 1 and 2.)

The pinion Q gears into a concentric toothed rim, U, at the outer side of the driving-wheel T.

V represents a tube, which is permanently secured in the framing of the machine at one side of the apron C, and about parallel therewith, and W is a similar tube, but somewhat less in diameter, so that it may work into and out from tube V. (See Fig. 4.)

The tube W has a rod, X, attached to its inner end, and this rod passes through the fixed tube V, and is connected to the frame N, and to the exterior of the tube W there are attached, at equal distances apart, springs Y, the inner ends of which are connected to levers Z. (See Fig. 4.) The springs Y have a sliding movement given them through the medium of the levers Z and the movement of the frame N, as will be presently described.

A' is a fixed bar, which is fitted longitudinally and centrally within the tube V, and which passes loosely through the head $g$ at the inner end of the tube W, as shown in Fig. 4.

B' is a tube, composed of two parts, $h\,h'$, the latter part $h'$, working on pivots $i\,i$, so as to operate like a jaw, and admit of the orifice of B' being enlarged and contracted to receive and compass the gavel which enters it. The part h is also elastic to admit of the contraction of the mouth or orifice of B', and the part h' is connected with the part h by a spring, j, which has a tendency to throw the outer end of h' upward to admit of the gavel entering B'.

The tube B' is attached to the bar A, the part h forming nearly a cone, and having a head, K, at its inner end, which is secured to the bar A'.

C' is a rake, which is attached to a crank, D', having a pinion, l, upon it which gears into a rack-bar, m, attached to the frame N.

The operation is as follows: As the machine is drawn along the grain is cut and falls upon the apron C, which remains stationary until the cam f actuates the lever s, and causes the latter to move the clutch R and connect the pinion Q with its shaft e. The crank P is then turned and draws back the frame N, and the rack-bar c, in consequence of gearing into the pinion d, moves the apron C in the direction indicated by the arrow. At the same time the tube W is shoved forward, and the part h' of the tube B' is shoved or pressed down, and the mouth of said tube contracted, while the rake K of slide J is, by the action of lever F, screw E, and arm H, shoved back in contact with the bar I, and the gavel passed up by the apron C until the center of the gavel is in line with the outer edge of the tube B'. This is effected by a half revolution of the crank P, which, in completing its revolution, draws forward the frame N, and, the tube W being drawn forward, the jaw or part h' of the tube B' is thrown open by the spring j, and the rake K moved by the means previously referred to, and the gavel raked into the open mouth of the tube B'. The gavel is now in position to be compressed and bound, which is done as follows:

The bands D' are all previously prepared and placed on the tube V, and the person who attends to this business has a seat directly over V with a foot at each side of it. With both hands the operator moves a band, D', over the ends of the springs Y, and upon the tube W. As the frame N is drawn back the tube W is shoved over tube B', and the parts h h' of the same compressed, and consequently the gavel, which is now within the tubes B W, and the band D', is shoved off from the tube W and around the gavel in consequence of the inner ends of the levers Z coming in contact with a shoulder, $a^x$, on the bar A. The frame N is then shoved outward under the action of crank P, the tube W also moving in the same direction. The jaw or part h' of the tube B is thrown up, and the rake C throws the bound gavel, or sheaf, out from the machine.

Having thus described my invention, I claim as new and desire to secure by Letters Patent—

1. The fixed tube V, in connection with the sliding tube W and the expanding tube B', arranged to operate in such a manner as to compress the gavels, and admit of the bands being adjusted on them, substantially as set forth.

2. The revolving rake C', in combination with the tubes V W B', substantially as and for the purpose specified.

3. The frame N, when used in connection with the tubes V W B' and rake C', and operated in the manner substantially as and for the purpose set forth.

4. The springs Y applied to the tube W, and arranged to operate in the manner substantially as and for the purpose specified.

T. W. PEIRCE.

Witnesses:
J. C. WILLIAMS,
DELANO T. SMITH.